(12) United States Patent
Grann et al.

(10) Patent No.: US 8,610,324 B2
(45) Date of Patent: Dec. 17, 2013

(54) MAGNETIC DRIVE ARRANGEMENT

(75) Inventors: Helge Grann, Bjerringbro (DK); Alfred Lisbjerg Pedersen, Bjerringbro (DK)

(73) Assignee: Grundfos Management a/s, Bjerringbro (DK)

( * ) Notice: Subject to any disclaimer, the term of this patent is extended or adjusted under 35 U.S.C. 154(b) by 673 days.

(21) Appl. No.: 12/740,549

(22) PCT Filed: Oct. 28, 2008

(86) PCT No.: PCT/EP2008/009090
§ 371 (c)(1),
(2), (4) Date: May 27, 2010

(87) PCT Pub. No.: WO2009/056271
PCT Pub. Date: May 7, 2009

(65) Prior Publication Data
US 2010/0237732 A1 Sep. 23, 2010

(30) Foreign Application Priority Data
Oct. 29, 2007 (EP) .................................... 07021100

(51) Int. Cl.
*H02K 1/28* (2006.01)
(52) U.S. Cl.
USPC ..................................... 310/103; 310/156.28

(58) Field of Classification Search
USPC ...................................... 310/103, 104, 156.28
See application file for complete search history.

(56) References Cited

U.S. PATENT DOCUMENTS

| 5,289,657 | A | * | 3/1994 | Kiel | 49/478.1 |
|---|---|---|---|---|---|
| 5,902,185 | A | * | 5/1999 | Kubiak et al. | 464/29 |
| 6,958,555 | B2 | * | 10/2005 | Mikkelsen | 310/261.1 |
| 7,057,320 | B2 | * | 6/2006 | Abordi et al. | 310/103 |
| 7,861,540 | B2 | * | 1/2011 | Cloutier et al. | 62/63 |
| 2002/0180295 | A1 | | 12/2002 | Kaneda et al. | |
| 2004/0169575 | A1 | | 9/2004 | Knauff et al. | |
| 2006/0290218 | A1 | * | 12/2006 | Shafer et al. | 310/156.28 |

FOREIGN PATENT DOCUMENTS

DE 10 2004 026453 A1 12/2004
EP 1 439 626 A1 7/2004

* cited by examiner

*Primary Examiner* — Tran Nguyen
*Assistant Examiner* — Naishadh Desai
(74) *Attorney, Agent, or Firm* — Panitch Schwarze Belisario & Nadel LLP

(57) ABSTRACT

A magnetic drive arrangement includes a multitude of permanent magnets (13) which are arranged along the periphery of a housing wall (15), wherein the magnets (13) are held with a non-positive fit by the housing wall (15) and bear on this. The manufacturing effort is simplified by way of the above-identified arrangement. One may advantageously apply parallelepiped magnets (13) as well.

9 Claims, 5 Drawing Sheets

MAGNETIC DRIVE ARRANGEMENT

CROSS-REFERENCE TO RELATED APPLICATIONS

This application is a Section 371 of International Application No. PCT/EP2008/009090, filed Oct. 28, 2008, which was published in the German language on May 7, 2009, under International Publication No. WO 2009/056271 A1 and the disclosure of which is incorporated herein by reference.

BACKGROUND OF THE INVENTION

The present invention relates to a magnetic drive arrangement.

Magnetic drive arrangements are applied for different purposes, for example as a rotor of brushless D.C. motors, or in magnetic couplings, in order, for example, to transmit the rotation of a drive shaft onto a driven shaft in a contactless manner. Such a coupling typically consists of an inner coupling part and an outer coupling part, which in each case are individually arranged in a preferably hermetically closed housing. Thereby, the inner coupling part comprises an inner support body which carries magnets which are distributed over its outer periphery and which are surrounded by a closed, sheet-metal casing as a housing. The outer coupling part comprises an annular support body which at its inner side is provided with magnets over the whole periphery and which is likewise encapsulated by a casing-like housing.

In order to achieve an as high as possible moment transmission, it is desirable to form the design such that the distance of the magnets between the inner and outer support body is as small as possible. In order to achieve this, the support bodies, magnets and housing are to be aligned to one another in an exact manner. With the state of the art, this is effected by way of fastening the magnets on the support body by way of bonding, before the surrounding housing casing is assembled. On the one hand, the distance of the magnets to the surrounding housing casing should be as small as possible, in order to ensure a high magnetic force development to the outside, and on the other hand, a gap should remain between the magnets and the housing casing, in order to be able to assemble this at all.

With known magnet couplings, the magnets in cross section are therefore shaped rounded to the outside with regard to the inner coupling part, in order thus to be able to achieve an as constant and small as possible distance to the housing casing over the whole surface of the magnet. Accordingly, the magnets of the outer coupling part in cross section are formed retracted inwards, in order to also achieve an as constant as possible distance to the housing casing here.

A disadvantage with this known magnet coupling is the fact that its manufacture is quite complicated, since the magnets must be bonded very carefully on the support body, and furthermore must be provided with a single-axis concavity, which corresponds roughly to the diameter of the housing casing on this side.

Against this background, it is the object of the present invention to design a magnetic drive arrangement with a multitude of permanent magnets which are arranged along the periphery of a housing wall, such that on the one hand, the manufacturing costs and assembly costs are reduced, and on the other hand the efficiency is increased.

BRIEF SUMMARY OF THE INVENTION

According to the present invention, the above-identified object is achieved by a magnetic drive arrangement with a multitude of permanent magnets that are arranged along a periphery of a housing wall. Advantageous designs of the present invention are specified in the claims, the subsequent description and the drawings. The magnetic drive arrangement is particularly advantageously applied for the construction of a magnetic coupling, as is specified in the claims, such as claim 29, with which two inventive drive arrangements are applied together into a magnetic coupling.

According to the present invention, the magnetic drive arrangement comprises a multitude of permanent magnets which are arranged along the periphery of a housing wall, wherein the magnets bear on the housing wall with a non-positive fit. The basic concept of the present invention is thus not to fix the magnets by way of a connection between the support body and the magnets, as with the state of the art, but with the help of the housing wall itself. Since the housing wall is typically designed as a thin casing of stainless steel, this e.g. in the extended condition may be pulled over the magnets and support body and then relieved, so that the intrinsic stress of the housing wall creates the non-positive fit between the magnet, housing wall and support body. The magnets, therefore, only need to be brought into the correctly specified position just before assembly, and thereafter are constantly held in a secure manner by the housing wall, and specifically not only by the positive fit which is present in any case, but also by a non-positive fit. Thus, they lie between the support body and housing wall without any play.

The drive arrangement according to the present invention may basically be applied in two variants, specifically in one in which an inner support body is provided, on whose outer periphery the magnets are arranged and which bear radially outwards on the inner side of the housing wall which surrounds them and holds then with a positive and non-positive fit. The magnets are then clamped between the inner support body and the inner side of the outer housing wall. The magnetic force is thus directed outwards from the outer housing wall.

Alternatively, the magnets may be arranged on the inner side of the inner housing wall and be clamped between this housing wall and an outer support body. With such an arrangement, the magnetic force is directed from the inner housing wall to the longitudinal middle axis of the housing. The latter drive arrangement with a coupling for example, forms the outer coupling part, whereas the first drive arrangement may form the inner coupling part or the rotor of a motor.

The support body is advantageously designed in an annular manner and may be designed in a magnetically conductive manner for increasing the magnetic forces. One may, however, also use a plastic component or other component. The annular design leads to a significant weight saving and may be particularly advantageously applied for the inner coupling part. With regard to the outer coupling part, the support body is annular at least in the region of the magnets, but it may also however be formed in a pot-like or other manner.

With the drive arrangement according to the present invention, the magnets are advantageously designed in an essentially parallelepiped manner. One may make do without an inwardly or outwardly curved shape, without weakening the force transmission of the coupling. This has the advantage that one requires no adaptation of the magnets to the shape of the housing. One may thus apply inexpensive magnets from large-scale production.

With the parallelepiped design of the magnets, these for example, with regard to the inner coupling part, bear with one side in a surfaced manner on the inner support body, and with two outer edges arranged parallel to the longitudinal middle axis of the drive arrangement, on the inner side of the housing wall, and specifically on the outer housing wall. One may completely make do without the usual gap required in particular for assembly purposes, by way of the fact that the magnets only bear with their edges on the housing wall. The housing casing, in a pre-stressed manner, may be pulled over the inner support body equipped with the magnets, so that this springs back in an elastic manner after relieving, and pushes onto the edges of the magnets and thus retains these in their correct position on the support body.

Advantageously, according to the present invention, one may use parallelepiped magnets also for a drive arrangement, as is for example used for the outer coupling part, wherein these then bear to the outside and in a surfaced manner on the support body, and to the inside have a roughly linear contact with the inner side of the inner housing wall. A comparable effect which is however the opposite in the force direction also occurs here, i.e. the pre-stressing of the inner housing wall presses roughly in each case in the middle onto the magnets which are supported in the outer support body in a surfaced manner.

Basically, according to the present invention, the magnets are held with a non-positive fit on or in the support body by the pre-stressing of the housing wall. This, however, does not rule out the provision of auxiliary means for assembly purposes, which fix the magnets on the support body until these are held by the housing wall. These auxiliary means may be removed or may also remain after attachment of the housing wall, depending on the application. Such auxiliary means according to the present invention may for example be elastic webs, which are arranged in the peripheral direction between the magnets and with which the magnets are arranged at a pre-defined distance and are mounted in this position on the support body. Such auxiliary means may however also be mechanical mountings, which may be removed again after the attachment of the housing wall, thus hold the magnets in the manner of a gripper during the assembly.

On application of the previously mentioned elastic webs, it is particularly advantageous for these to be firmly connected to the support body, preferably to be formed as one piece with this as a plastic injection moulded part. The magnets may then be incorporated in a simple manner between these elastic webs located on the support body, wherein the distance of the webs is preferably somewhat smaller than the clear width of the magnets in this region, so that the magnets may be held by way of a non-positive fit between the webs.

Alternatively or additionally, recesses for the magnets may be provided in the support body, according to a further formation of the invention. Thereby, it is particularly advantageous for the recesses to be provided in the form of grooves in the support body, which extend parallel to the longitudinal middle axis of the drive arrangement and which are provided for the positive-fit accommodation of the magnets. Such a groove arrangement has the advantage that a recess, thus a groove, may serve for the arrangement of several magnets, if specifically two or more magnets are arranged in the groove one after the another in the longitudinal direction of the groove. With the arrangement, all magnets are equally poled in a groove. This means that all magnets in a groove are poled such that their north pole lies radially inwards and their south pole radially outwards, whilst in the next adjacent groove, preferably all magnets are arranged such that their south pole lies radially inwards and their north pole radially outwards. The magnets are thus alternately poled over the periphery, but are always equally poled within a groove. Such an arrangement further has the advantage that with couplings which must transmit large moments and are therefore designed relatively long, one does not need to apply special magnets, but commercially available, parallelepiped magnets may be used, which are then arranged in a suitable number behind one another in the respective groove.

If the magnets lie within the support body in a recess, thus for example in a groove, it is then advantageous if a magnet lies within the recess with maximally 20% of its radial extension, and furthermore, thus with minimally 80% of its radial extension, projects beyond this recess, thus projects radially from the outer periphery or inner periphery of the support body. According to a further formation of the present invention, one envisages the wall being part of a housing which hermetically surrounds the magnets and advantageously also the support body, since magnets are typically sensitive to humidity. Such a housing preferably consists of stainless steel sheet, wherein the steel alloy is matched to the surrounding medium to be expected, in particular with regard to the corrosion resistance.

The support body and shaft are to be connected to one another mechanically in a rotational fixed manner, in order to ensure a transmission of torque between the support body and a drive shaft or driven shaft. Thereby, for reasons of saving weight and material, it is particularly advantageous not to connect the support body directly to the shaft, but to advantageously connect the support body via force transition means arranged at the end-side, to a hub, which is then seated on a shaft. With a drive arrangement with which the support body surrounds the magnets at the outside, it is particularly useful to connect this directly to the preferably hollow shaft at the end-side.

Two of the previously described magnetic drive arrangements are advantageously unified into a magnetic coupling, which, for transmitting a rotational movement, is provided with an inner coupling part and an outer coupling part, which are arranged in one another in a rotatable manner and are magnetically connected in drive to one another. The coupling parts may then be formed as described above.

Such a magnetic coupling may be particularly advantageously provided for the connection between an electric motor and a centrifugal pump, in order to reliably insulate the electric motor with respect to the medium delivered by the pump. Such an arrangement has the advantage that quasi any motor, also so-called standard motors may be applied, which are comparatively inexpensive, and thus inasmuch as this is concerned, one may make do without expensive small-series motors and special motors. Moreover, such a magnetic coupling has the advantage that one may do away with the can which is otherwise typically provided with centrifugal pumps, or with the otherwise necessary seals which are prone to wear.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

The invention is hereinafter described in more detail by way of an embodiment example represented in the drawing. There are shown in the drawings.

DETAILED DESCRIPTION OF THE INVENTION

Figure 1:
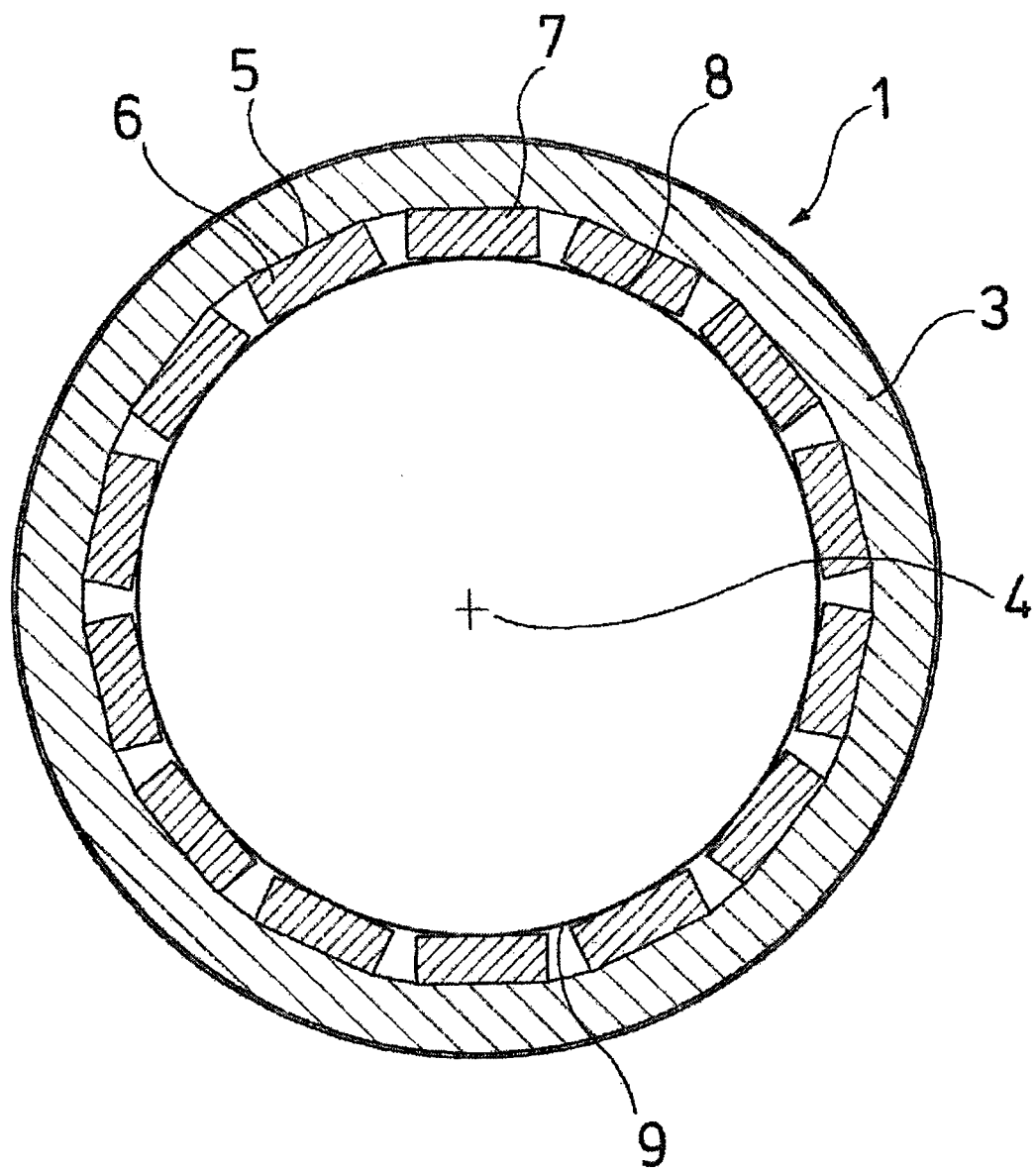
FIG. 1 is a cross sectional plan view of an outer coupling part in accordance with a preferred embodiment of the present invention.
Figure 2:
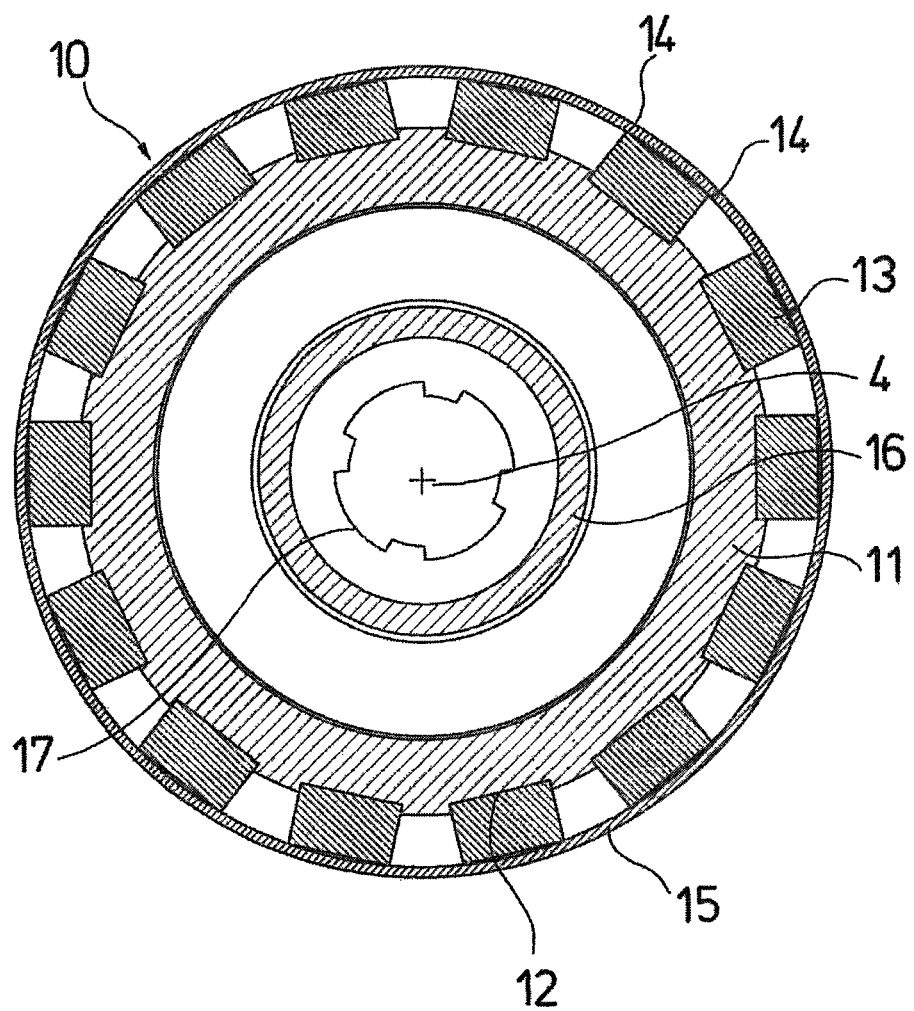
FIG. 2 is cross sectional plan view of an inner coupling part in accordance with a preferred embodiment of the present invention.

Certain terminology is used in the following description for convenience only and is not limiting. The words "inwardly" and "outwardly" refer to directions toward and away from, respectively, the geometric center of the device, and designated parts thereof, in accordance with the present invention. Unless specifically set forth herein, the terms "a," "an" and "the" are not limited to one element, but instead should be read as meaning "at least one." The terminology includes the words noted above, derivatives thereof and words of similar import.

Referring to the drawings in detail, wherein like numerals indicate like elements throughout the several views, FIGS. 1-5 show an outer part 1 of a magnetic coupling 2 that preferably consists of an annular, outer support body 3, which on its inner side comprises grooves 5 which are preferably arranged parallel to the longitudinal middle axis 4, in which grooves magnets 6 are arranged. The magnets 6 are preferably arranged distributed at the same distance over the inner periphery of the support body 3 by way of the grooves 5. Preferably, the magnets 6 have a rectangular cross section and with their radially outwardly facing flat side 7 in each case lie in a groove 5. At the inwardly facing flat side 8 distanced thereto, they preferably bear on the inner side of the inner housing wall 9, which forms part of a housing hermetically closing the magnets 6. The inner housing wall 9 preferably presses the magnets into the grooves 5 by way of pre-stressing. An approximately linear bearing parallel to the longitudinal middle axis 4 results on the inner housing wall 9 due to the fact that the magnets 6 have a rectangular shape.

An inner part 10 of the magnetic coupling 2 preferably comprises a support body 11 which is likewise designed in an annular manner and over its outer periphery is provided with grooves 12 which are arranged parallel to the longitudinal middle axis 4, in which magnets 13 lie. The magnets 13 with regard to their number are preferably the same as that of the magnets 6, and likewise have a rectangular cross section. They preferably bear in each case with two edges 14 on the inner side of an outer housing wall 15, which likewise forms part of a housing hermetically closing the magnets 13, and is pre-stressed in a manner such that it presses the magnets 13 into the grooves 12 with a non-positive fit. The support body 11 is preferably annular and is connected to a hollow cylinder 16, which is arranged at a distance within the support body 11, and is provided with a profile 17 over a part of its length, the counter profile of which is seated on a shaft and thus forms a shaft-hub connection for a shaft. The construction of the inner part 10 in detail is to be deduced from FIG. 3.

Figure 3:
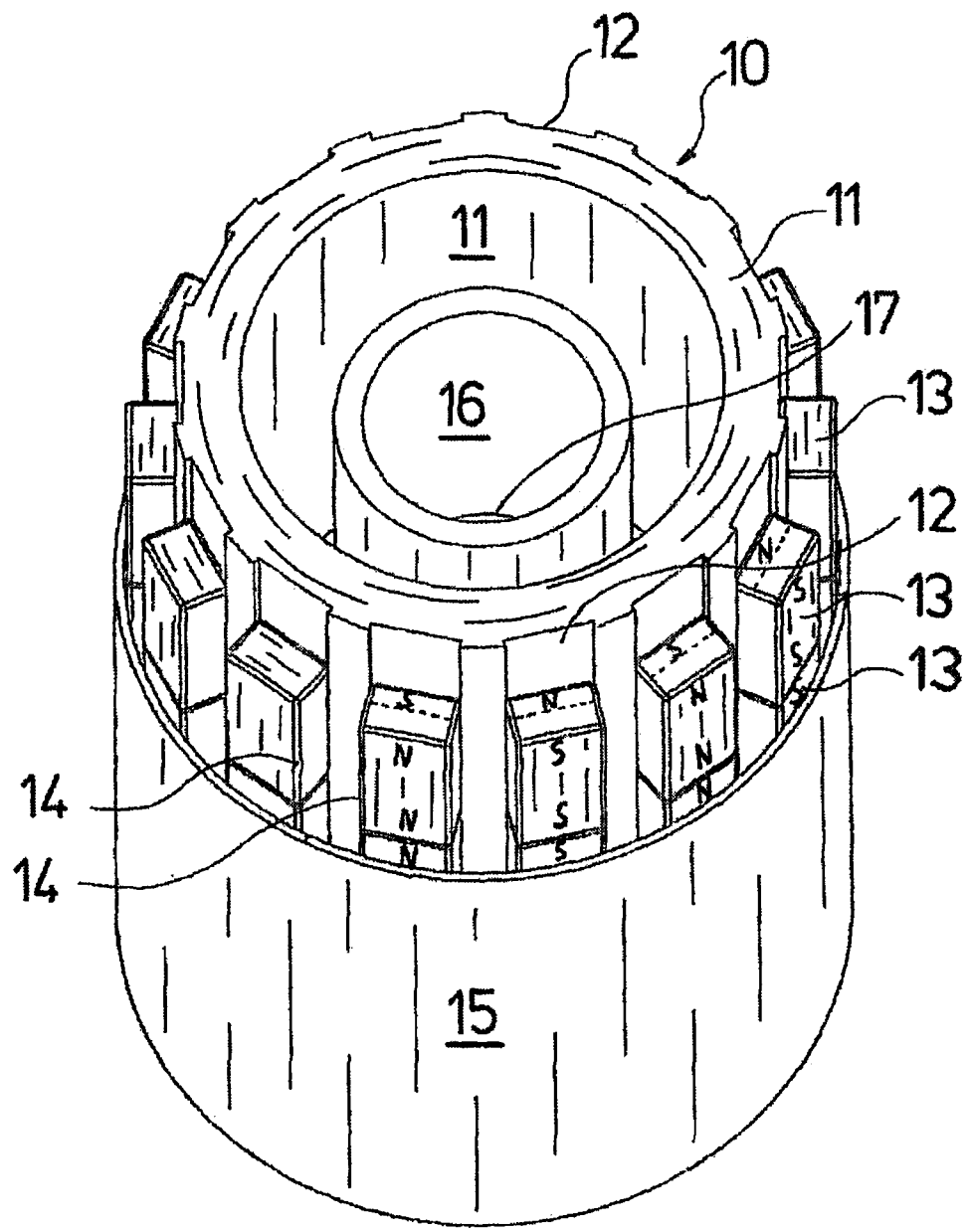
FIG. 3 is perspective view of an inner coupling part with a partly sectioned housing.

As is shown particularly in FIG. 3, several magnets 13 preferably lie one behind the other seen in the longitudinal direction of the groove, in the grooves 12. The magnets 13 thereby are arranged such that they are magnetised in the radial direction, i.e. the north pole and south pole of the individual magnets are in each case distanced to one another in the radial direction. The magnets which are arranged one behind the other in the longitudinal direction in a groove 12, are aligned in an equal manner with regard to their polarity, i.e. all magnets in a groove 12 are aligned such that their north poles and their south poles are situated on the same side in the radial direction. Thereby, the polarity alternates in the peripheral direction of magnets lying next to one another, as is represented by the characterisation S for the south pole and N for the north pole in FIG. 3. This means that the magnets 13 are arranged in a groove, such that their north pole lies radially inwards and their south pole lies radial outwards, whereas in the two adjacent grooves 12, the magnets are arranged such that their south pole lies radial inwards and their north pole lies radially outwards.

Figure 5:
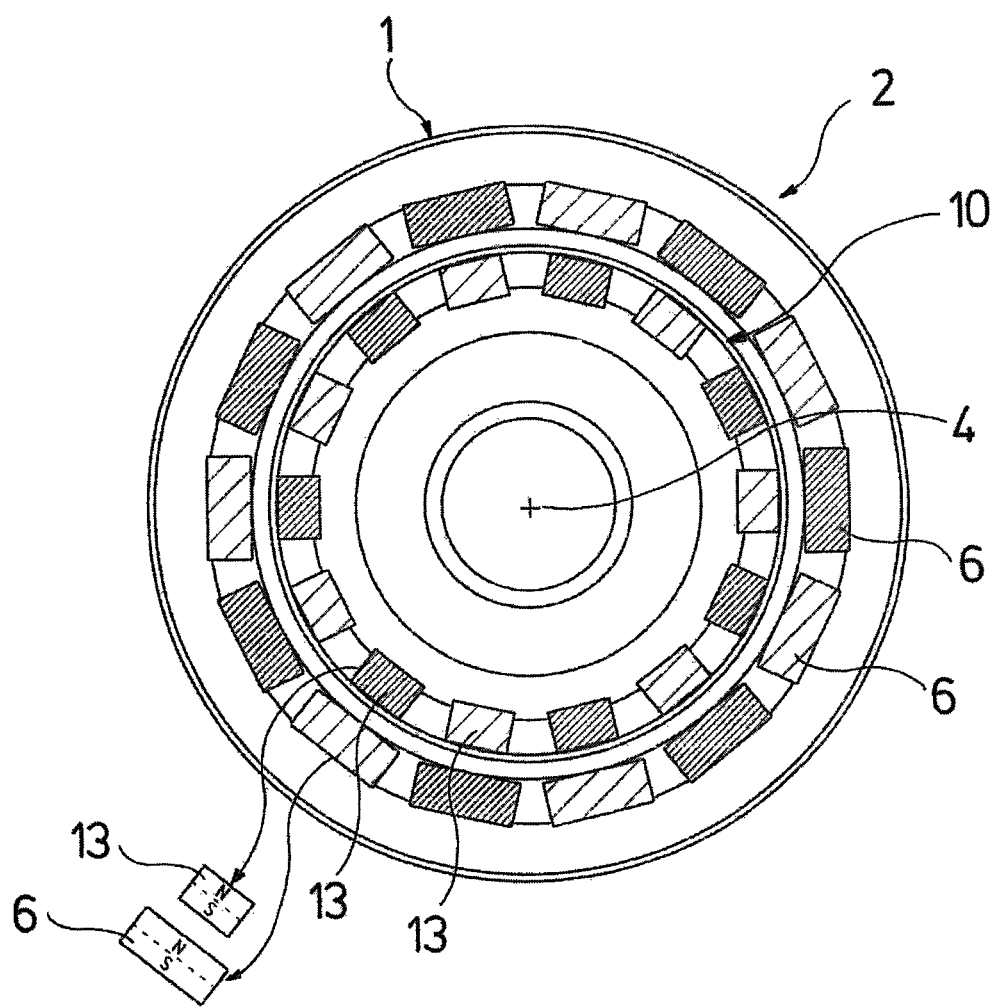
FIG. 5 is a cross sectional elevation view of the inner and the outer coupling parts shown in FIGS. 1-3 in active connection.

The arrangement of the polarities in interaction is evident by way of FIG. 5, in which the coupling is shown in the coupled condition, i.e. when the inner part 10 is arranged within the outer part 1 and is connected to this in a rotationally fixed manner by the magnetic forces of the magnets 6 and 13. The polarity is shown by way of example for the magnets 6, 13 in a cut-out enlargement, in FIG. 5. It is to understood that with regard to the magnets which are in each case adjacent to these, the polarity is just the opposite, i.e. the north poles lie radial outwards and the south poles radially inwards. The magnets in the peripheral direction are thus always poled in an alternating manner.

As FIG. 5 makes clear, the outer part 1 as well as the inner part 10, have a hermetically tight housing, so that the magnets 6, 13 are reliably protected with respect to environmental influences, in particular surrounding fluid. A gap is preferably formed between the outer housing wall 15 of the inner part 10 and the inner housing wall 9 of the outer part 1, so that the outer part and inner part are not mechanically connected to one another, and may be rotated to one another after overcoming the magnet force.

Figure 4:
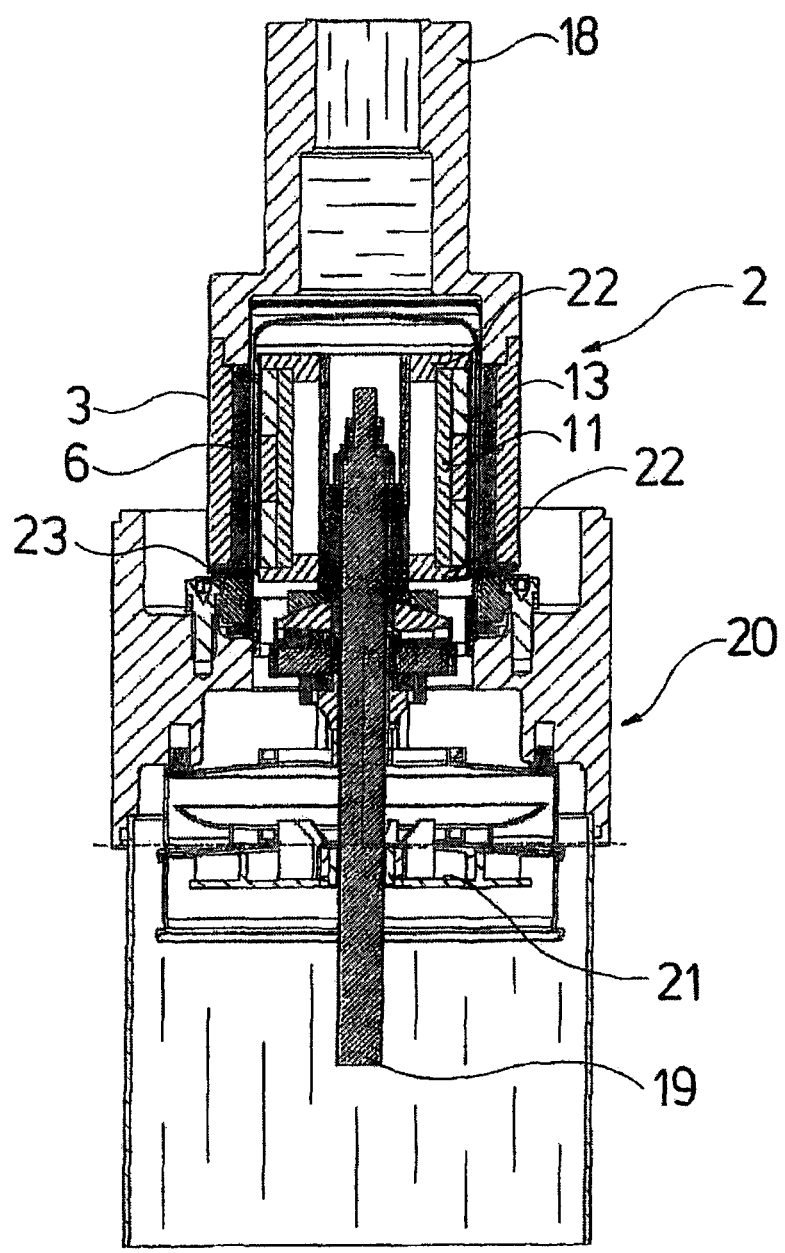
FIG. 4 is a cross sectional elevation view of a centrifugal pump with a magnetic coupling connected thereto in accordance with a preferred embodiment of the present invention.

In the installed condition according to FIG. 4, the magnetic coupling 2 is provided for the contact-free connection between an input shaft 18 and a drive shaft 19. The drive shaft 19 here forms the drive shaft of a centrifugal pump 20, which is not shown or described in detail herein for the sake of brevity and, therefore, is not limiting. One may recognise an impeller 21 in the sectioned representation. As the sectioned representation according to FIG. 4 further shows, the support body 11 of the inner part 10 is connected via two end-side annular disks 22 to the hollow cylinder 16. These components, in the previously described embodiment, are of metal and are firmly welded to one another, wherein the annular disks 22 project radially beyond the support body 11 and the magnets 13, and are connected to the outer housing wall 15 in a sealed and firm manner by way of welding.

However, with regard to the outer part 2, the support body 3 at its side which is distant to the pump 20, connects directly onto the hollow shaft 18 which in this region is designed in a stepped manner. The support body 3 of the outer part 1, to the other side, is preferably covered by way of an annular disk 23, so that the magnets 6 are held in the grooves 12 with a positive fit, also in the longitudinal direction of the grooves. The support body 3, the hollow shaft 18, the annular disk 23 and the inner housing wall 9 are welded to one another in a firm and sealed manner, so that here too, the magnets 6 are hermetically closed with respect to fluid influences.

With the shown coupling, the magnets 6 and 13 are held in the grooves 5 and 12 respectively by way of pressing in, before assembly of the housing walls 9 and 15. One may, however, also provide auxiliary tools or other auxiliary means, in order to fix this position during the assembly, and these are either removed after the attachment and the relieving of the housing walls 9 and 15, or remain there.

The depth of the grooves 5 and 12 is selected such that they are maximally 20% of the radial extension of the associated magnets 6, 13, thus the distance between the flat sides 7 and 8. The groove depth is 10% of the radial extension of the magnets 6 and 13 with the represented embodiment examples.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A magnetic drive arrangement with a multitude of permanent magnets (6, 13), which are arranged along a periphery of a housing wall (9, 15), wherein the magnets (6, 13) bear on the housing wall (9, 15) with a non-positive fit, wherein the magnets (6, 13) are distanced and mounted in a peripheral direction by way of elastic webs are firmly connected to the support body (3, 11) and designed as one piece with the support body (3, 11) as a plastic injection moulded part.

2. A magnetic drive arrangement with a multitude of permanent magnets (6, 13), which are arranged along a periphery of a housing wall (9, 15), wherein the magnets (6, 13) bear on the housing wall (9, 15) with a non-positive fit, wherein recesses (5, 12) are provided in the support body (3, 11) for positive-fit accommodation of the magnets (6, 13), and wherein at least one of the magnets (6, 13) lies with maximally 20% of its radial extension within the recess (5, 12).

3. A magnetic drive arrangement with a multitude of permanent magnets (6, 13), which are arranged along a periphery of a housing wall (9, 15), wherein the magnets (6, 13) bear on the housing wall (9, 15) with a non-positive fit, wherein two or more magnets (6, 13) are arranged in a groove (5, 12) one behind the other in a longitudinal direction of the groove (5, 12), and wherein all magnets (6, 13) in a groove (5, 12) are poled in the same direction.

4. A drive arrangement according to claim 3, wherein the housing wall (9, 15) is part of a housing which hermetically surrounds the magnets (6, 13) and the support body (3, 11) and which is formed of stainless steel sheet.

5. A drive arrangement according to claim 4, wherein the support body (3, 11) is connected to a shaft (18, 19) in a rotationally fixed manner.

6. A magnetic coupling (2) for the transmission of a rotation movement, with an inner coupling part (10) and with an outer coupling part (1), which are arranged in one another in a rotatable manner and are magnetically connected in drive with one another, wherein the coupling parts (2, 10) are formed by drive arrangements according to claim 3.

7. A magnetic coupling according to claim 6, wherein the magnetic coupling (2) forms the connection between an electric motor and a centrifugal pump (20).

8. A drive arrangement according to claim 3 wherein the magnets (6, 13) are essentially parallelepiped-shaped, and wherein each of the magnets (6, 13) has two outer edges (14) bearing on the inner side of the outer housing wall (15) or has an inwardly facing surface (8) thereof bearing on the inner side of the inner housing wall (9).

9. A drive arrangement according to claim 3, wherein the magnets (13) are arranged on an inner side of the housing wall (15) and are clamped between the inner side of the housing wall and an inner support body (11).

* * * * *